US007613162B2

(12) United States Patent
Vaittinen et al.

(10) Patent No.: US 7,613,162 B2
(45) Date of Patent: Nov. 3, 2009

(54) MOBILE DEVICE, SYSTEM AND METHOD FOR ENHANCED CHANNEL ALLOCATION WHEN RADIO RESOURCE CONNECTION IS RELEASED WHILE IN DUAL TRANSFER MODE

(75) Inventors: Rami Vaittinen, Keppel Bay (SG); Antti O. Kangas, Oulunsalo (FI)

(73) Assignee: Nokia Corporation, Espoo (FI)

( * ) Notice: Subject to any disclaimer, the term of this patent is extended or adjusted under 35 U.S.C. 154(b) by 356 days.

(21) Appl. No.: 11/321,660

(22) Filed: Dec. 28, 2005

(65) Prior Publication Data

US 2006/0159059 A1     Jul. 20, 2006

Related U.S. Application Data

(60) Provisional application No. 60/641,911, filed on Jan. 5, 2005.

(51) Int. Cl.
*H04B 7/212*     (2006.01)

(52) U.S. Cl. .................. 370/347; 370/397; 370/428; 370/310; 370/311; 370/458; 370/376; 370/386; 370/400; 370/465; 455/427.1; 455/12.1; 455/40; 455/452.2; 455/454

(58) Field of Classification Search .............. 370/347, 370/458, 386, 466, 375, 376, 400, 465, 358, 370/397, 537, 352, 258, 328, 310, 311; 455/427, 455/1, 12.1, 512, 430, 428, 452.2, 454, 558, 455/422.1, 145, 552.1; 709/233, 226, 206, 709/235, 231, 228, 219, 250

See application file for complete search history.

(56) References Cited

U.S. PATENT DOCUMENTS 4,603,416 A * 7/1986 Servel et al. ................ 370/417

(Continued)

FOREIGN PATENT DOCUMENTS

WO     WO 03/096571     11/2003

OTHER PUBLICATIONS

3GPP TS 44.060 v6.5.0 (Dec. 2003); 3rd Generation Partnership Project; Tech. Spec Grp FSM/EDGE Radio Access Network; General Packet Radio Service (GPRS); Mobile Station (MS) Base Station (BSS) Interface; Radio Link Control/Medium Access Control (RLC/MAC) Protocol (Release 6).

(Continued)

*Primary Examiner*—Rafael Pérez-Gutiérrez
*Assistant Examiner*—Joseph Arevalo
(74) *Attorney, Agent, or Firm*—Ware, Fressola, Van Der Sluys & Adolphson LLP (57) ABSTRACT

A mobile device, system, and method are disclosed for use in a wireless communication system during the mobile device's transition from a dual mode, in which a packet switched connection and circuit switched connection are used together, to a single mode in which packets are transferred. When the circuit switched connection is released, packet resources are allocated by converting timeslots used for circuit switched connection traffic into timeslots used for packet data traffic. Also included is a new alert signal within an existing message to the mobile device during the circuit switched connection release phase, before completion of the circuit switched connection release phase, in order to inform the mobile device that the converting step will occur after release of the circuit switched connection.

16 Claims, 8 Drawing Sheets

U.S. PATENT DOCUMENTS

| | | | | |
|---|---|---|---|---|
| 4,766,590 | A * | 8/1988 | Hamada et al. | 370/407 |
| 6,094,429 | A * | 7/2000 | Blanchette et al. | 370/347 |
| 6,243,580 | B1 * | 6/2001 | Garner | 455/428 |
| 6,266,330 | B1 * | 7/2001 | Jokinen et al. | 370/329 |
| 6,542,739 | B1 * | 4/2003 | Garner | 455/427 |
| 6,600,741 | B1 * | 7/2003 | Chrin et al. | 370/375 |
| 6,721,568 | B1 | 4/2004 | Gustavsson et al. | 455/450 |
| 7,016,342 | B2 | 3/2006 | Vaittinen et al. | 370/352 |
| 2004/0152478 | A1 * | 8/2004 | Ruohonen et al. | 455/502 |
| 2005/0207396 | A1 | 9/2005 | Vaittinen et al. | 370/352 |
| 2005/0249148 | A1 | 11/2005 | Nakamata et al. | 370/328 |

OTHER PUBLICATIONS

3GPP TS 43.064 v6.1.0 (Aug. 2003); 3rd Generation Partnership Project; Tech. Spec. Grp GSM/EDGe Radio Access Network; General Packet Radio Service (GPRS); Overall Description of the GPRS Radio Interface; Stage 2 (Release 6).

3GPP TS 44.018 v6.5.0 (Dec. 2003); 3rd Generation Partnership Project; Tech. Spec. Grp GSM/EDGE Radio Access Network; Mobile Radio Interace Layer 3 Specification; Radio Resource Control (RRC) Protocol (Release 6).

3GPP TS 23.060 v6.3.0 (Dec. 2003); 3rd Generation Partnership Project; Tech. Spec. Grp Services and System Aspects; General Packet Radio Serivce (GPRS); Service Description; Stage 2 (Release 6).

3GPP TS 43.055 v6.7.0 (Nov. 2004); 3rd Generation Partnership Project; Technical Specification Group GSM/EDGE Radio Access Network: Dual Transfer Mode (DTM); Stage 2 (Release 6).

3GPP TSG RAN WG1 meeting #38bis, R1-041073; "Allocation and measurement of Enhanced Uplink Resources"; pp. 1-4; Sep. 20-24, 2004.

* cited by examiner

Combined timeslot (e.g. TCH/H & PDTCH/H)

Shared timeslot (e.g. PDTCH)

MOBILE DEVICE, SYSTEM AND METHOD FOR ENHANCED CHANNEL ALLOCATION WHEN RADIO RESOURCE CONNECTION IS RELEASED WHILE IN DUAL TRANSFER MODE

CROSS REFERENCE TO RELATED APPLICATION

The present invention claims priority to U.S. Provisional Patent Application 60/641,911 filed Jan. 5, 2005.

FIELD OF THE INVENTION

The present invention relates to wireless communication, and more particularly to packet switching and circuit switching for wirelessly communicating with a mobile terminal.

BACKGROUND OF THE INVENTION

The first GSM (Global System for Mobile communication) networks were designed for voice services. When the use of GSM data services began, it became evident that the Circuit Switched (CS) bearer services were not particularly well-suited for certain types of applications with a bursty nature. Therefore, the new Packet Switched (PS) data transmission service GPRS (General Packet Radio Service) was defined for packet services. GPRS is a packet radio network utilising the GSM network, which endeavours to optimize data packet transmission by means of GPRS protocol layers on the air interface between a mobile device (e.g. a mobile station) and a GPRS network.

A GPRS mobile device (MS) can operate in one of three modes of operation: class A, class B, and class C modes of operation. See, for example, 3GPP TS 23.060, "Service description; Stage 2" which is incorporated herein by reference. In the class A mode of operation, the MS is attached to both GPRS and other GSM services. The mobile user can make and/or receive calls on the two services simultaneously, for example having a normal GSM voice call and receiving GPRS data packets at the same time. In class B mode of operation, the MS is attached to both GPRS and other GSM services, but the MS can only operate one set of services at a time. In class C mode of operation, the MS can only be attached either to the GSM network or the GPRS network. The selection is done manually and there are no simultaneous operations.

A problem occurs with MS behavior when the MS operates in the class A mode (i.e. dual transfer mode) of operation. According to standards, when the MS releases a CS connection (i.e. an RR connection) while in the Dual Transfer Mode (DTM), packet resources may be aborted. See, for example, 3GPP TS 44.018, "Radio Resource Control Protocol" which is incorporated herein by reference. This problem is separate from the problems encountered when changing from packet transfer mode to dual transfer mode, as discussed in U.S. patent application Ser. No. 10/802,407 filed Mar. 16, 2004 (incorporated herein by reference). This problem is likewise separate from the problems encountered when a mobile device is forced to idle its packet switching capabilities, when transitioning from dual transfer mode to packet transfer mode, as discussed in U.S. patent application Ser. No. 10/763,936 (incorporated herein by reference).

If the network and the MS support an enhanced DTM CS release procedure, the MS may directly enter packet transfer mode when an RR connection has been released. This is illustrated in the FIG. 1. Also see 3GPP TS 43.064, "Overall description of the GPRS radio interface; Stage 2" (incorporated herein by reference).

Based on the current standard (3GPP TS 44.018, "Radio Resource Control Protocol," incorporated herein by reference), when the MS is in packet transfer mode and a CS connection (also referred to as a radio resource or RR connection) is needed, then all packet resources must first be aborted, then an RR connection is established, and finally packet resources may be requested. This process occurs, for example, when the MS initiates a call.

Figure 1:
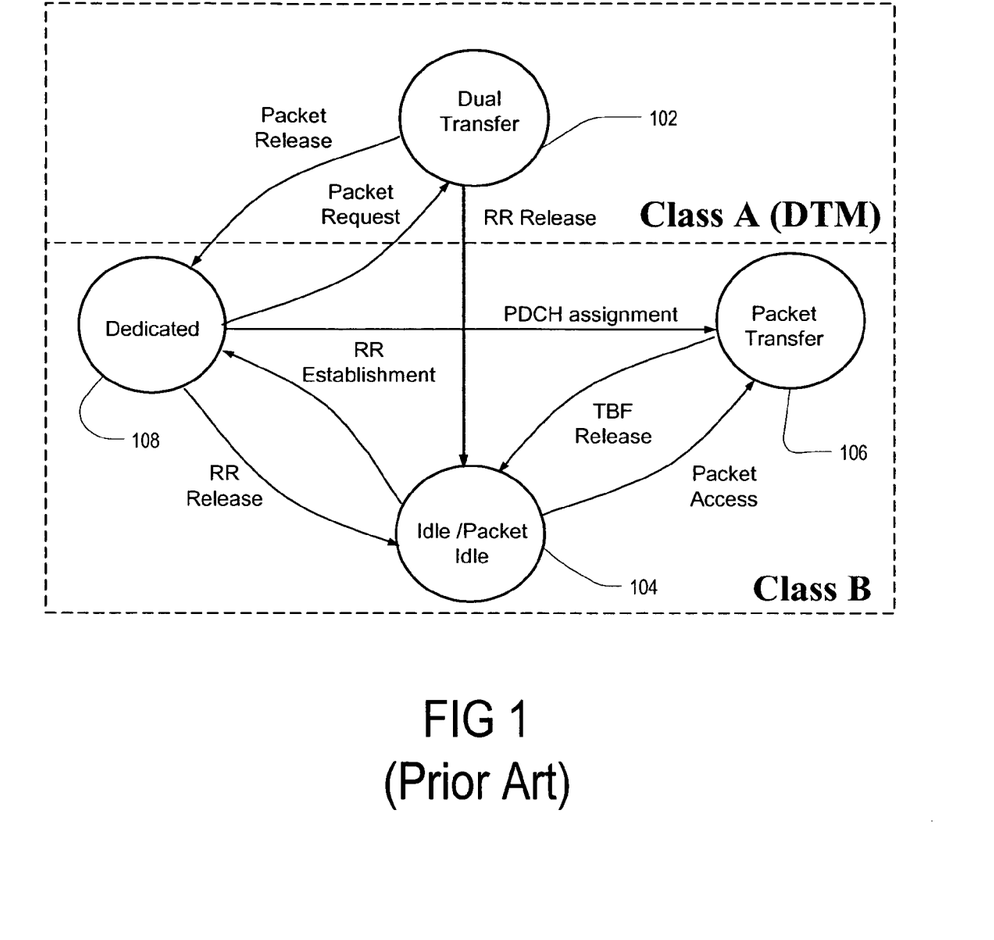
FIG. 1 shows RR operating modes and transitions for classes A (DTM supported) and B, according to the prior art.

This prior art system is illustrated in FIG. 1 (also see 3GPP TS 43.064, "Overall description of the GPRS radio interface; Stage 2," mentioned above), which shows RR operating modes and transitions between Class-A (DTM supported) and Class-B. A Temporary Block Flow (TBF) Release moves the MS from the Packet Transfer Mode 106 into an Idle/Packet Idle state 104, after which the MS must then establish a dedicated RR connection 108 in order to then access dual transfer mode 102 that includes both packet transfer capability and RR capability. In other words, after the release of the packet transfer connection 106, the MS is in the packet idle mode 104 and must perform a complete acquisition of system information and ask for PS resources all over again, in order to get into the Dual Mode 102 via the dedicated CS mode 108.

Figure 2:
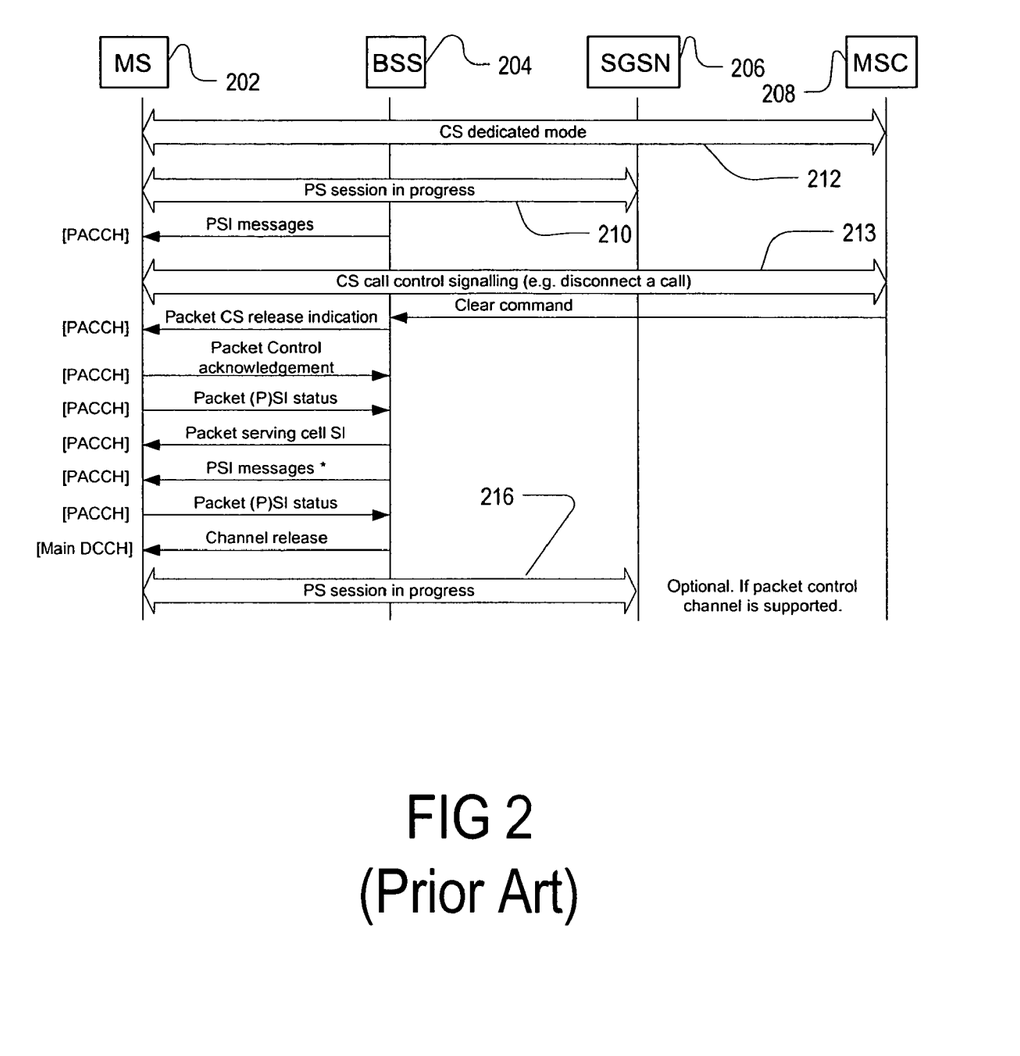
FIG. 2 shows the enhanced DTM CS release procedure while in dual transfer mode, according to the prior art.

FIG. 2 illustrates how the prior art system works with the enhanced DTM CS release procedure. The four vertical lines represent portions or stages of the network. The line 202 represents the mobile device (MS), the line 204 represents the base station system (BSS), the line 206 represents the serving GPRS support node (SGSN), and the line 208 represents the mobile switching center (MSC). FIG. 2 shows that initially a circuit switched session 212 and a packet switched session 210 are in progress according to the dual mode. Then, either the MS or the network can initiate a disconnect 213 of the CS connection, which causes the circuit switched call to be released at call control level and subsequently the channel is released. In FIG. 2, the CS=RR connection is released and the MS moves to packet transfer mode 216. The MS can maintain its packet resources only in timeslots used for packet transfer. Therefore, the MS releases a single timeslot allocated only for the RR connection or single timeslot shared with the RR connection and packet transfer. While in packet transfer mode, the network likely reconfigures and increases the number of allocated timeslots for the MS with current procedures specified in 3GPP TS 44.060, "Radio Link Control/Medium Access Control (RLC/MAC) protocol," mentioned above.

Unfortunately, the present standard does not specify the allocation of timeslots (i.e. the number and location in the TDMA structure is not specified) to be used in packet transfer mode after the release of the RR connection. The current working assumption is that the mobile device could use the packet resource that is used in dual transfer mode, excluding (e.g. the number and location excluding) a possible timeslot shared with the RR connection traffic. However, there is currently no way to flexibly allocate packet resources when the RR connection is released while in dual transfer mode.

SUMMARY OF INVENTION

The present invention describes how radio resources used for an RR connection can be converted to packet resources without any additional signaling in the radio interface, and how the network can indicate allocated radio resources to be used in packet transfer mode by the MS after the release of an RR connection while in dual transfer mode. This invention improves upon the prior art, so that packet resources can be allocated in a flexible manner when the RR connection is released while in dual transfer mode.

According to the present invention, unnecessary additional signaling, such as transmission of a PACKET TIMESLOT RECONFIGURE message, in packet transfer mode can be avoided, because channel allocation is already transmitted while in dual transfer mode. Moreover, the network may allocate more radio resources, which the mobile device can use immediately after the release of the RR connection.

The mobile device, system, method, and software of the present invention are for use in a wireless communication system while the mobile device transitions from a dual mode, in which a packet switched connection and circuit switched connection are used together, to a single mode in which packets are transferred. When the circuit switched connection is released, packet resources are allocated by converting timeslots used for circuit switched connection traffic into timeslots used for packet data traffic. Also, an alert is provided to the mobile device within an existing message, during the circuit switched connection release phase, but before completion of the circuit switched connection release phase, in order to inform the mobile device about the converting step that will occur after release of the circuit switched connection.

DETAILED DESCRIPTION OF THE INVENTION

Two primary embodiments will be described here: a conversion solution, and also a reconfiguration solution. However, it is to be understood that these embodiments are examples of how the present invention can be implemented, and are not to be construed as limiting the scope of the invention.

Regarding the conversion solution, a first option involves minimal change to the current working assumption, and would keep in packet transfer mode the same radio resources on one or more Packet Data Channels (PDCHs) than assigned in dual transfer mode. In addition, the network may make a conversion from the radio resources allocated for the RR connection to the packet resources. In dual transfer mode, the allocated radio resource for the RR connection can be either a full timeslot or half timeslot shared with packet transfer. In both cases, it is proposed that the network may make a conversion for the timeslot used for RR connection traffic (e.g. traffic channels TCH/F or TCH/H) to the packet data traffic (e.g. Packet Data Traffic Channel PDTCH).

Figure 3:
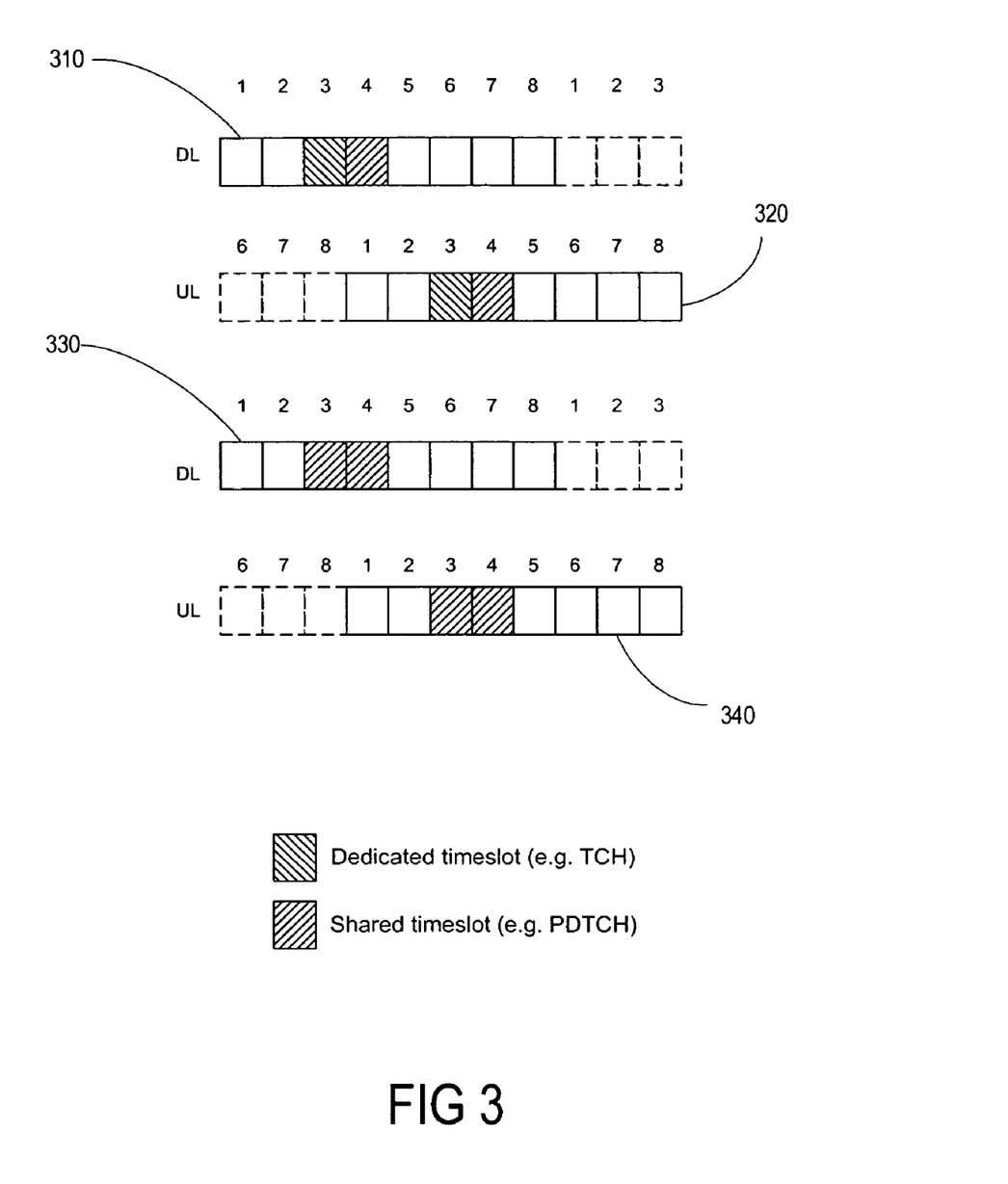
FIG. 3 depicts conversion of multislot class 5 allocation.

FIG. 3 presents the conversion of the multislot class 5 allocation in which TCH/F is converted to the PDTCH/F. Two upper time division multiple access (TDMA) frame structures 310 and 320 present timeslot allocation while in dual transfer mode, and two lower TDMA frame structures 330 and 340 present corresponding timeslot allocation after the release of the RR connection while in packet transfer mode.

Figure 4:
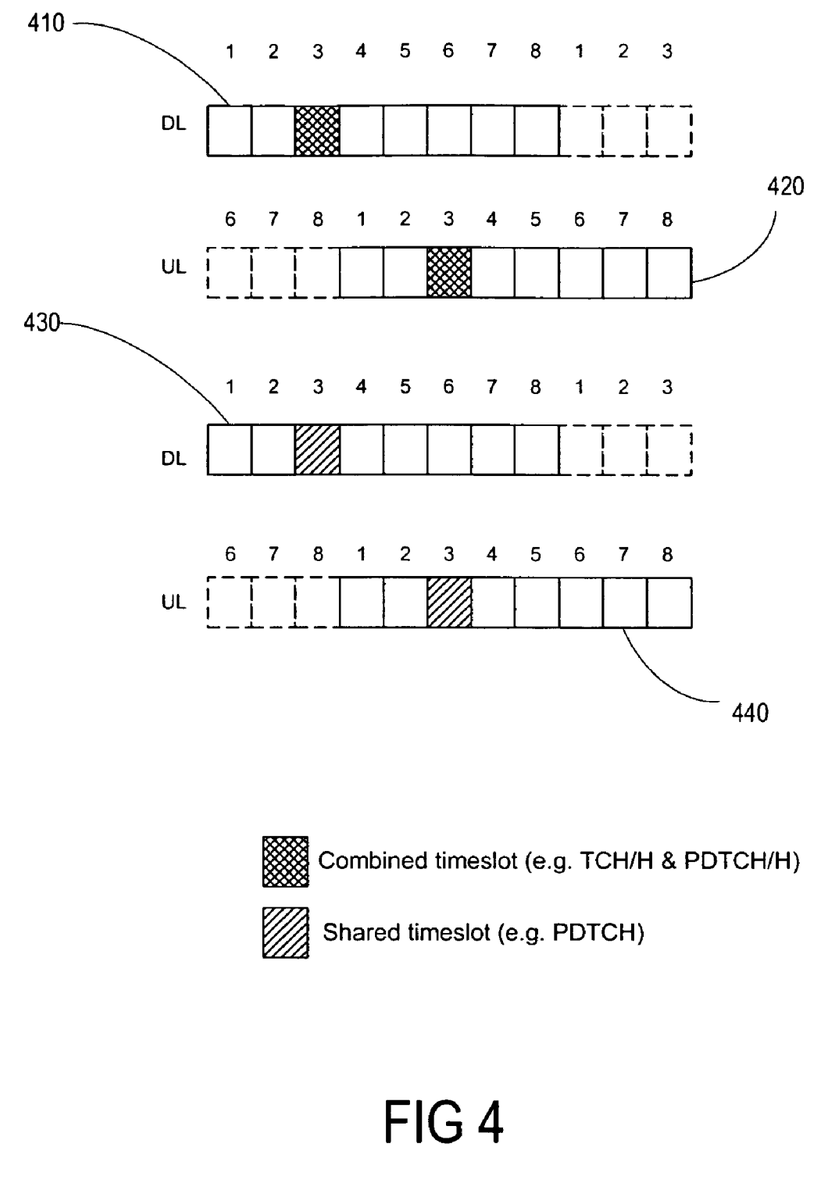
FIG. 4 shows conversion of optional single timeslot allocation.

FIG. 4 illustrates how optional single timeslot allocation can be converted. Again, two upper time division multiple access (TDMA) frame structures 410 and 420 present an initial timeslot allocation, and two lower TDMA frame structures 430 and 440 present corresponding subsequent timeslot allocation. The combined timeslot is converted to the single PDTCH/F timeslot used by the mobile device while in the packet transfer mode.

Figure 5:
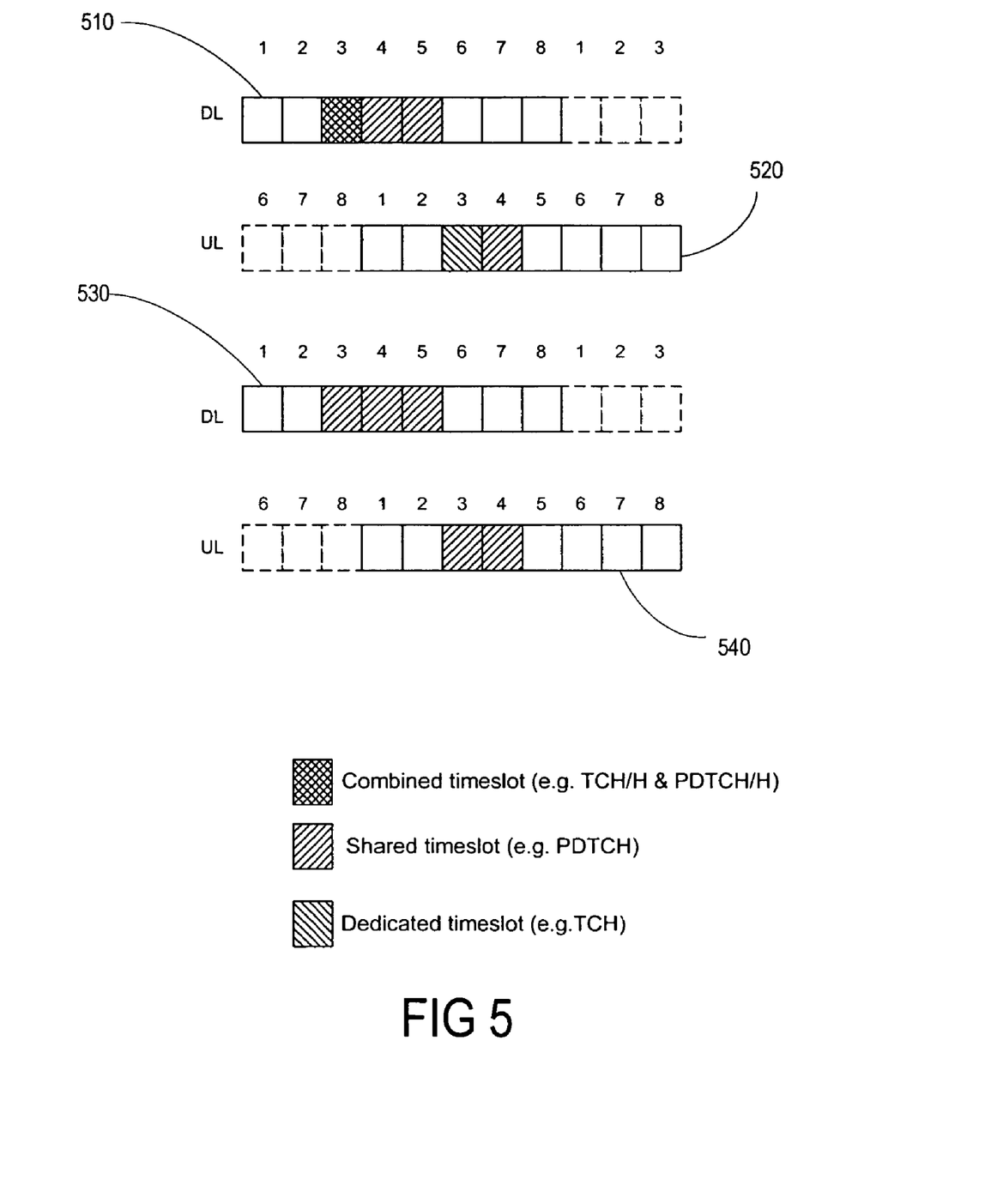
FIG. 5 illustrates conversion of multislot class 11 timeslot allocation.

FIG. 5 depicts the last example of possible conversion cases. Once again, two upper time division multiple access (TDMA) frame structures 510 and 520 present an initial timeslot allocation, and two lower TDMA frame structures 530 and 540 present corresponding subsequent timeslot allocation. In this case, a combined downlink timeslot is converted to a single PDTCH/F and single uplink timeslot with allocated TCH/H to the single PDTCH/F. The network needs to send an alert in order to inform the MS that the conversion will happen after the release of the RR connection. This indication is needed because the network may not have enough resources to be allocated for the MS (i.e. a free timeslot will be used for other purposes). According to the present embodiment of the invention, this indication is added either in the PACKET CS RELEASE INDICATION, the CHANNEL RELEASE, or in another message.

Regarding the reconfiguration solution mentioned above, the full solution is to give full control for the network to assign a radio resource on one or more PDCHs on the same or a different carrier. According to the present embodiment of the invention, the network indicates, in the RR connection release phase, reconfigured downlink and uplink packet resources to the MS. The network may use for reconfiguration either the PACKET CS RELEASE INDICATION or another message. The latter option, involving another message, can entail using a PACKET TIMESLOT RECONFIGURE message as specified in 3GPP TS 44.060, "Radio Link Control/Medium Access Control (RLC/MAC) protocol." In this case, the enhanced DTM CS release indication parameter is also added in the PACKET TIMESLOT RECONFIGURE message. In any event, the previous option (i.e. the use of the PACKET CS RELEASE INDICATION message) may often be preferable, because it is already adapted for the enhanced DTM CS release procedure. Here is an example of the message content for this option.

< Packet CS Release message content > :: =

< PAGE_MODE: bit(2) >

< GLOBAL_TFI:< Global TFI IE >>

< ENHANCED_DTM_CS_RELEASE_INDICATION:bit >

{0 | 1 < Packet Uplink Assignment < Uplink Assignment IE >>}

{0 | 1 < Packet Downlink Assignment < Downlink Assignment IE >>}

< padding bits >

Specifying uplink and downlink assignments in the PACKET CS RELEASE INDICATION message offers the most efficient coding for the information. This conclusion is based on the fact that the PACKET TIMESLOT RECONFIGURE message is already specified in the R97 and therefore includes information, which is not relevant in this particular case. Such irrelevant information may lead to the segmentation of the message and therefore longer transmission time and delaying the release of the RR connection even longer.

Figure 6:
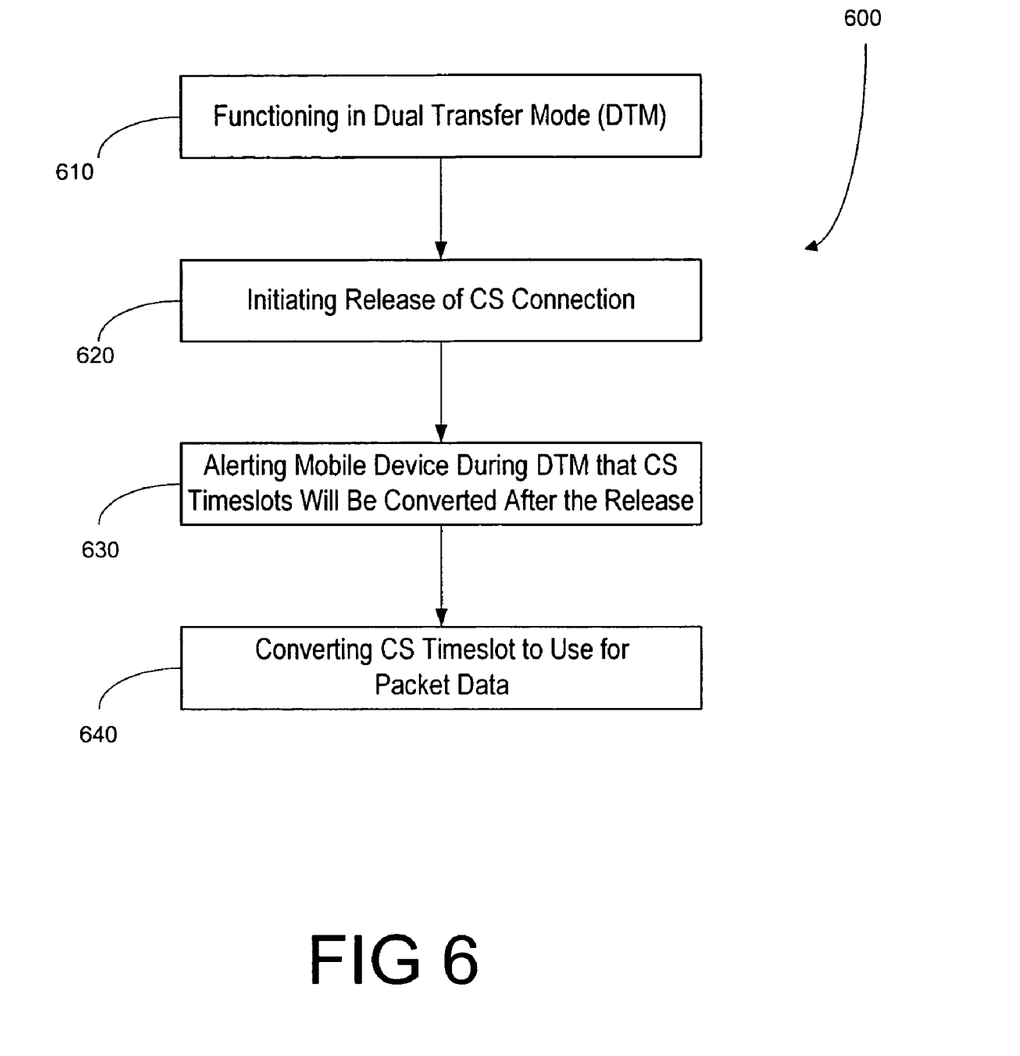
FIG. 6 is a flow chart illustrating an embodiment of a method according to the present invention.

Turning now to FIG. 6, a method 600 is shown for allocating packet resources when a circuit switched connection is released. Initially, a mobile device is functioning 610 in dual transfer mode (DTM), in which a packet switched connection and circuit switched connection are used together. Then, release of the circuit switched connection is initiated 620, either by the mobile device or at the network side. During the release phase (i.e. before the release is complete), the mobile device is alerted 630 about impending conversion of timeslots from CS to packet data. Subsequently, the timeslots are converted 640 from circuit switched to packet data traffic.

Figure 7:
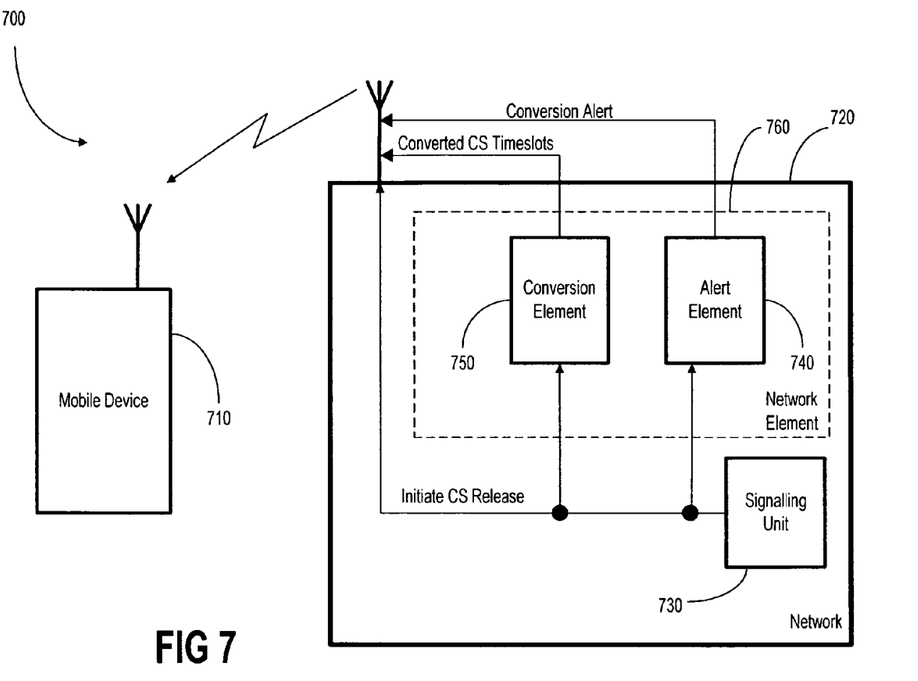
FIG. 7 illustrates a system according to an embodiment of the present invention.

FIG. 7 is a block diagram showing an example of a system 700 for performing the method just described. The system includes, of course, the mobile device 710 which communicates with a network 720, initially using the dual transfer mode. Within the network, a signaling unit 730 is for signaling initiation of release of the circuit switched connection between the mobile device and a network (release could alternatively be initiated by the mobile device). In response to initiation of CS release, an alert element 740 sends a conversion alert to the mobile device, and subsequently a conversion element 750 converts timeslots from CS to packet data. The alert element 740 and the conversion element 750 can be implemented in a network element 760, while the signaling unit 730 can alternatively be located in the mobile device 710.

Figure 8:
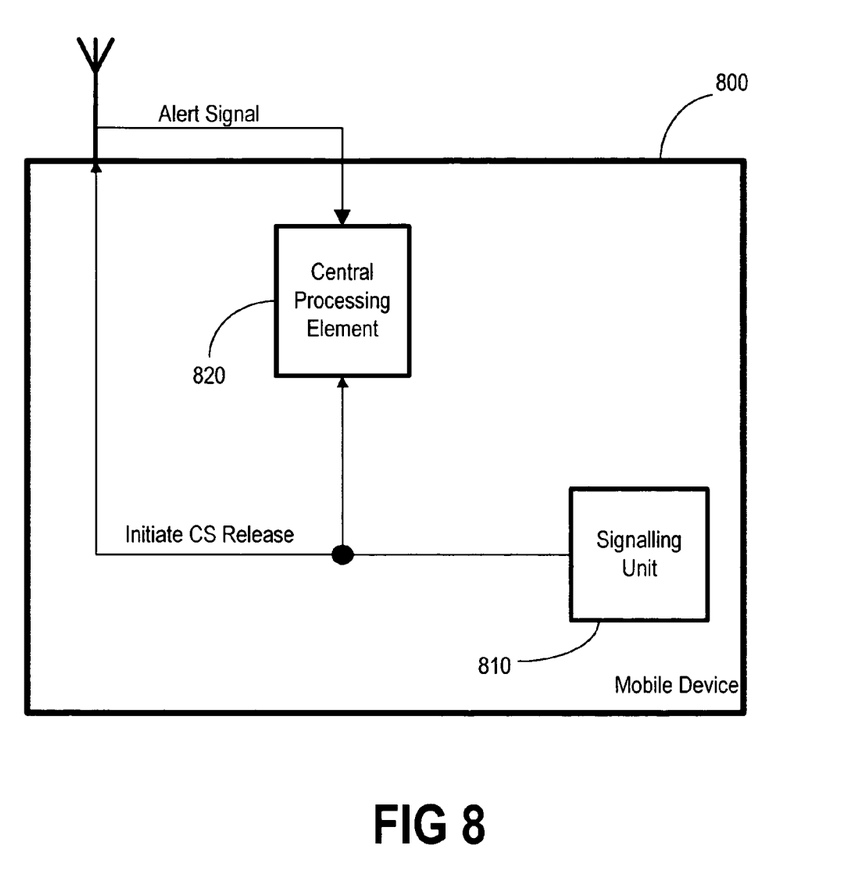
FIG. 8 is a block diagram of a mobile device according to an embodiment of the present invention.

Turning now to FIG. 8, this shows a mobile device 800 according to an embodiment of the present invention. As mentioned, a signaling unit 810 can initiate release of circuit switched resources at the mobile side, instead of the network side. In response, the mobile device will receive an alert signal informing the mobile device about impending conversion of timeslots from CS to packet switched data. This alert information can enable a central processing element 820 to prepare for receipt of the converted timeslots once the dual transfer mode has ended.

It is to be understood that all of the present figures, and the accompanying narrative discussions of best mode embodiments, do not purport to be completely rigorous treatments of the method, mobile device, system, network element, and software under consideration. A person skilled in the art will understand that the steps and signals of the present application represent general cause-and-effect relationships that do not exclude intermediate interactions of various types, and will further understand that the various steps and structures described in this application can be implemented by a variety of different combinations of hardware and software, in various configurations and sequences, which need not be further elaborated herein.

What is claimed is:

1. A system comprising:

a mobile device equipped to function in dual transfer mode wherein a packet switched connection and circuit switched connection are used together, a signaling unit configured to signal initiation of release of the circuit switched connection between the mobile device and a network, a conversion element in the network, responsive to the initiation of release, and configured to convert a timeslot used for circuit switched connection traffic into a timeslot used for packet data traffic for a mobile device, and an alert element, responsive to the initiation of release, and configured to provide an alert signal to the mobile device, while the mobile device is in the dual transfer mode, to inform to the mobile device about the converting that will occur after release of the circuited switched connection, wherein the alert signal is included in a release indication, or in a channel release, instead of in a packet timeslot reconfigure message;

wherein the conversion element is configured to keep in packet transfer mode timeslots already used for packet data traffic, wherein the conversion element is further configured to add more timeslots that are to be used for packet data traffic, and wherein the conversion element is further configured to deallocate the timeslots that were used for circuit switched traffic.

2. The system of claim 1, wherein an initial allocation of radio resources during the dual transfer mode includes at least one full radio resource timeslot, or includes a half radio resource timeslot joined with packet data.

3. The system of claim 1, wherein the alert signal is indicative of reconfigured downlink and uplink packet resources.

4. The system of claim 1, further comprising an alert element for alerting the mobile device, during a circuit switched connection release phase but before completion of said circuit switched connection release phase, that the converting will occur after release of the circuit switched connection.

5. A method comprising:

functioning in dual transfer mode, wherein a packet switched connection and circuit switched connection are used together, initiating release of the circuit switched connection, converting a timeslot used for circuit switched connection traffic into a timeslot used for packet data traffic for a mobile device, and providing an alert, in response to initiating release of the circuit switched connection to a mobile device, while the mobile device is in dual transfer mode, about the converting step that will occur after release of the circuit switched connection, wherein the alert is included in a release indication, or in a channel release, instead of in a packet timeslot reconfigure message, wherein the converting keeps in packet transfer mode timeslots already for packet data traffic, wherein the converting adds more timeslots that are to be used for packet data traffic, and wherein the converting de-allocates the timeslots that were used for circuit switched traffic.

6. The method of claim 5, wherein an initial allocation of radio resources during dual transfer mode includes at least one full radio resource timeslot, or includes a half radio resource timeslot joined with packet data.

7. The method of claim 5, wherein the alert occurs after the initiating step, and wherein the alert indicates reconfigured downlink and uplink packet resources.

8. The method of claim 5, further comprising alerting a mobile device, during a circuit switched connection release phase but before completion of said circuit switched connection release phase, that the converting step will occur after release of the circuit switched connection.

9. An apparatus comprising:
a conversion element in the network, responsive to initiation of release during dual transfer mode of a circuit switched connection between a mobile device and said network, said conversion element being configured to convert a timeslot used for circuit switched connection traffic into a timeslot used for packet data traffic; and
an alert element, responsive to the initiation of release, and configured to provide an alert signal to the mobile device, while the mobile device is in the dual transfer mode, to inform the mobile device about the converting that will occur after release of the circuit switched connection,
wherein the alert is included in a release indication, or in a channel release, instead of in a packet timeslot reconfigure message;
wherein the conversion element is configured to keep in packet transfer mode timeslots already used for packet data traffic,
wherein the conversion element is further configured to add more timeslots that are to be used for packet data traffic, and
wherein the conversion element is further configured to deallocate the timeslots that were used for circuit switched traffic.

10. A computer readable medium encoded with a software data structure, the computer readable medium having executable codes embedded therein, the codes, when executed, adapted for:
operating the dual transfer mode, wherein a packet switched connection and the circuit switched connection are used together,
initiating release of the circuit switched connection during the dual transfer mode,
converting a timeslot used for circuit switched connection traffic into a timeslot used for packet data traffic for a mobile device, and
providing an alert, in response to initiating release of the circuit switched connection, a mobile device, while the mobile device is in the dual transfer mode, about the converting that will occur after release of the circuit switched connection,
wherein the alert is included in a release indication, or in a channel release, instead of in a packet timeslot reconfigure message;
wherein the converting keeps in packet transfer mode timeslots already used for packet data traffic,
wherein the converting adds more timeslots that are to be used for packet data traffic, and
wherein the converting de-allocates the timeslots that were used for circuit switched traffic.

11. An apparatus comprising:
a signaling unit configured to signal initiation of release of a circuit switched connection between the apparatus and a network, and
a central processing element, responsive to an alert signal received from the network while the apparatus is in dual transfer mode, wherein the alert signal is included in a release indication, or in a channel release, instead of in a packet timeslot reconfigure message and provided in response to the initiation of release, and said central processing element being configured to prepare to receive and process timeslots that are converted by the network from use with circuit switched connection traffic into timeslots used for packet data traffic,
wherein in the dual transfer mode a packet switched connection and circuit switched connection are used together,
wherein the central processing element is configured to keep in packet transfer mode timeslots already used for packet data traffic,
wherein the central processing element is further configured to add more timeslots that are to be used for packet data traffic, and
wherein the central processing element is further configured to deallocate the timeslots that were used for circuit switched traffic.

12. The apparatus of claim 11, wherein an initial allocation of radio resources during the dual transfer mode includes at least one full radio resource timeslot, or includes a half radio resource timeslot joined with packet data.

13. The apparatus of claim 11, wherein the alert signal is indicative of reconfigured downlink and uplink packet resources.

14. The apparatus of claim 11, wherein the alert signal is received during a circuit switched connection release phase but before completion of said circuit switched connection release phase.

15. An apparatus comprising:
means for signaling initiation of release of a circuit switched connection between the apparatus and a network, and
means for preparing to receive and process timeslots, responsive to an alert signal received from the network while the apparatus is in dual transfer mode, wherein the alert signal is included in a release indication, or in a channel release, instead of in a packet timeslot reconfigure message and provided in response to the initiation of release, and said timeslots being converted by the network from use with circuit switched connection traffic into timeslots used for packet data traffic,
wherein in the dual transfer mode a packet switched connection and circuit switched connection are used together,
wherein the means for preparing is configured to keep in packet transfer mode timeslots already used for packet data traffic,
wherein the means for preparing is further configured to add more timeslots that are to be used for packet data traffic, and
wherein the means for preparing is further configured to deallocate the timeslots that were used for circuit switched traffic.

16. The apparatus of claim 11, wherein an initial allocation of radio resources during the dual transfer mode includes at least one full radio resource timeslot, or includes a half radio resource timeslot joined with packet data.

* * * * *

UNITED STATES PATENT AND TRADEMARK OFFICE
CERTIFICATE OF CORRECTION

PATENT NO. : 7,613,162 B2 Page 1 of 1
APPLICATION NO. : 11/321660
DATED : November 3, 2009
INVENTOR(S) : Vaittinen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 531 days.

Signed and Sealed this

Nineteenth Day of October, 2010

David J. Kappos
*Director of the United States Patent and Trademark Office*